US011029160B1

(12) United States Patent
Keith et al.

(10) Patent No.: US 11,029,160 B1
(45) Date of Patent: Jun. 8, 2021

(54) PROJECTORS, PROJECTOR SYSTEMS, AND METHODS OF NAVIGATING TERRAIN USING PROJECTED IMAGES

(71) Applicant: Hamilton Sundstrand Corporation, Charlotte, NC (US)

(72) Inventors: Christopher A. Keith, Wilsonville, OR (US); Bobby Foote, Berea, KY (US); Weston James Lahr, Sherwood, OR (US)

(73) Assignee: HAMILTON SUNSTRAND CORPORATION, Charlotte, NC (US)

( * ) Notice: Subject to any disclaimer, the term of this patent is extended or adjusted under 35 U.S.C. 154(b) by 0 days.

(21) Appl. No.: 16/784,827

(22) Filed: Feb. 7, 2020

(51) Int. Cl.
*G01C 21/20* (2006.01)
*G03B 21/20* (2006.01)
*H04N 9/31* (2006.01)
*G06T 3/00* (2006.01)
*G01B 11/25* (2006.01)
*G01S 17/89* (2020.01)

(52) U.S. Cl.
CPC ......... *G01C 21/20* (2013.01); *G03B 21/2033* (2013.01); *G06T 3/005* (2013.01); *H04N 9/3161* (2013.01); *H04N 9/3182* (2013.01); *H04N 9/3185* (2013.01); *G01B 11/2513* (2013.01); *G01S 17/89* (2013.01)

(58) Field of Classification Search
None
See application file for complete search history.

(56) References Cited

U.S. PATENT DOCUMENTS

| 3,614,237 | A | 10/1971 | Kyle | |
|---|---|---|---|---|
| 8,022,986 | B2 * | 9/2011 | Jekel | F41G 3/26 348/139 |
| 9,305,449 | B2 | 4/2016 | Goszyk | |
| 10,083,361 | B2 | 9/2018 | Schamp | |
| 2006/0153427 | A1 * | 7/2006 | Zanzucchi | G06K 9/00664 382/113 |
| 2009/0201486 | A1 * | 8/2009 | Cramblitt | G01S 17/931 356/4.01 |
| 2017/0216633 | A1 * | 8/2017 | Cadogan | A41D 13/02 |

* cited by examiner

*Primary Examiner* — Frank S Chen
(74) *Attorney, Agent, or Firm* — Cantor Colburn LLP (57) ABSTRACT

A projector includes a light source arranged along an optical axis, a reticle optically coupled to the light source by the optical axis, and a projection lens. The projection lens is optically coupled to the reticle by the optical axis and has a navigation feature defined thereon for displaying an image of the navigation feature projected along the optical axis on terrain disposed within a field of view of the projector. Projection systems and methods of navigating terrain using projected images are also described.

18 Claims, 8 Drawing Sheets

PROJECTORS, PROJECTOR SYSTEMS, AND METHODS OF NAVIGATING TERRAIN USING PROJECTED IMAGES

BACKGROUND

The present disclosure is generally related to navigation, and more particularly to navigating terrain where ambient illumination is limited or degraded.

Navigation devices are commonly employed to assist with navigation in environments with limited and/or degraded illumination. For example, navigation devices in terrestrial settings generally have the capability to obtain external data from Wi-Fi systems to provide the user with information to assist in navigation. Some navigation devices can also obtain external data from global positioning satellites (GPS) to provide the user with information to assist in navigation. Access to such sources of external data typically reduce the risk of injury or accident while navigating environments under conditions of limited or degraded illumination.

In some environments access to Wi-Fi and/or GPS can be limited, such as due to interruption or absence of the infrastructure required for Wi-Fi and/or GPS communication. For example, Wi-Fi and GPS communication is generally unavailable in lunar environments. Lunar trekkers are therefore typically unable employ Wi-Fi and GPS-based utilities and must rely upon solar illumination to appreciate features in lunar terrain being traversed to navigate the lunar environment. Since the lunar atmosphere is too thin to sufficiently scatter ambient solar illumination to illuminate features shielded from direct solar illumination, it can be difficult for lunar trekkers to appreciate certain features, e.g., depths of recesses and features in shaded areas. Failure to appreciate such features can increase the risk of injury and/or equipment damage during lunar trekking due to tripping over rises or stumbling over.

Such conventional systems and methods have generally been acceptable for their intended purpose. However, there remains a need in the art for improved systems and methods for navigating environments having limited and/or degraded illumination. The present disclosure provides a solution to this need.

BRIEF DESCRIPTION

A projector is provided. The projector includes a light source arranged along an optical axis, a reticle optically coupled to the light source along the optical axis, and a projection lens optically coupled to the reticle along the optical axis. The reticle has a navigation feature defined thereon for displaying an image of the navigation feature projected along the optical axis on terrain disposed within a field of view of the projector.

In addition to one or more of the features described above, or as an alternative, further examples of the projector may include that the light source includes a laser arranged to illuminate the navigation feature with laser light.

In addition to one or more of the features described above, or as an alternative, further examples of the projector may include that the light source includes a visible source arranged to illuminate the navigation feature with visible light.

In addition to one or more of the features described above, or as an alternative, further examples of the projector may include that the navigation feature is fixed to the reticle and defines a grid pattern.

In addition to one or more of the features described above, or as an alternative, further examples of the projector may include that the navigation feature includes a water or ice tag or a mineral tag.

In addition to one or more of the features described above, or as an alternative, further examples of the projector may include the navigation feature includes an overlay of the terrain disposed within the field of view of the projector.

In addition to one or more of the features described above, or as an alternative, further examples of the projector may include a micro display arranged on the reticle and configured to form one or more of a grid pattern, a water or ice tag, a mineral tag and an overlay of the terrain disposed within the field of view of the projector.

In addition to one or more of the features described above, or as an alternative, further examples of the projector may include a sensor in communication with the terrain disposed within the field of view of the projector.

In addition to one or more of the features described above, or as an alternative, further examples of the projector may include that the sensor includes a time-of-flight sensor or a structured light sensor optically coupled to the terrain disposed within the field of view of the projector.

In addition to one or more of the features described above, or as an alternative, further examples of the projector may include the projection lens has a slow lens or a laser scanning system.

In addition to one or more of the features described above, or as an alternative, further examples of the projector may include an upper torso hard shell having a helmet seat and a shoulder portion, and a helmet fixed to the helmet seat of the upper torso hard shell, wherein the projector is coupled to the shoulder portion of the upper torso hard shell.

In addition to one or more of the features described above, or as an alternative, further examples of the projector may include that the projector is fixed relative to the helmet.

In addition to one or more of the features described above, or as an alternative, further examples of the projector may include a stabilization module coupled to the projector and arranged to allow the upper torso hard shell to move relative to the projector while the projector is fixed relative to the terrain disposed within the field of view of the projector.

In addition to one or more of the features described above, or as an alternative, further examples of the projector may include a shifting element arranged to bypass the navigation feature with light communicated by the light source.

A projector system is also provided. The projector system includes a projector as described above and a controller. The reticle includes a micro display arranged on the reticle and arranged along the optical axis. The controller is operably connected to the micro display and responsive to instructions recorded on a non-transitory machine-readable memory to illuminate the navigation feature with light source illumination to generate a navigation feature image, project the navigation feature image into the field of view of the projector with the projection lens, and display the navigation feature image on the terrain disposed within the field of the projection lens.

In addition to one or more of the features described above, or as an alternative, further examples of the projector system may include the instructions further cause the controller to select a color for the at least one of a grid pattern, a water or ice tag, a mineral tag, and an overlay of terrain disposed along the optical axis with the micro display; illuminate the micro display with light having the selected color; and display the at least one of a grid pattern, a water or ice tag, a mineral tag, and an overlay of the terrain disposed along the optical axis on the terrain disposed along the optical axis with the selected color.

In addition to one or more of the features described above, or as an alternative, further examples of the projector system may include a time-of-flight sensor or a structured light sensor disposed in communication with the controller and having a field of view intersecting the optical axis of the projector, and that the instructions cause the controller to acquire image data of the terrain disposed along the optical axis; and reconstruct an image of the terrain with the micro display; and project the image of the terrain by illuminating the micro display with the light source for display on the terrain from the which the image data was acquired.

In addition to one or more of the features described above, or as an alternative, further examples of the projector system may include that reconstructing the image includes distorting the image for conformal display on the terrain disposed along the optical axis.

In addition to one or more of the features described above, or as an alternative, further examples of the projector system may include that the instructions further cause the controller to generate a one or more of a predetermined map, a predetermined schematic, and a predetermined procedure with the micro display; and project an image of the one or more of a predetermined map, a predetermined schematic, and a predetermined procedure along the optical axis with the light source.

A navigation method is additionally provided. The method includes, at a projector as described above, illuminating the navigation feature with light source illumination to generate a navigation feature image, projecting the navigation feature image into a field of view of the projector with the projection lens, and displaying the navigation feature image on terrain disposed within the field of the projection lens.

The present disclosure provides the capability to display grid patterns and/or navigation information on terrain negotiated by vehicles. In certain environments a grid is projected from the navigation system and displayed on the terrain in the path of the vehicle. The displayed grid conforms to the terrain and provide the vehicle driver, pilot or control system with awareness of the terrain contour. In accordance with certain examples the navigation system includes a sensor device. The sensor device acquires information regarding the terrain in the path of the vehicle and the navigation system projecting information regarding the terrain for display on the terrain. It is also contemplated that, in accordance with certain examples, that the navigation system also projects light on the terrain in the path of the vehicle to illuminate the vehicle path along the terrain.

BRIEF DESCRIPTION OF THE DRAWINGS

The following descriptions should not be considered limiting in any way. With reference to the accompanying drawings, like elements are numbered alike.

DETAILED DESCRIPTION

Figure 1:
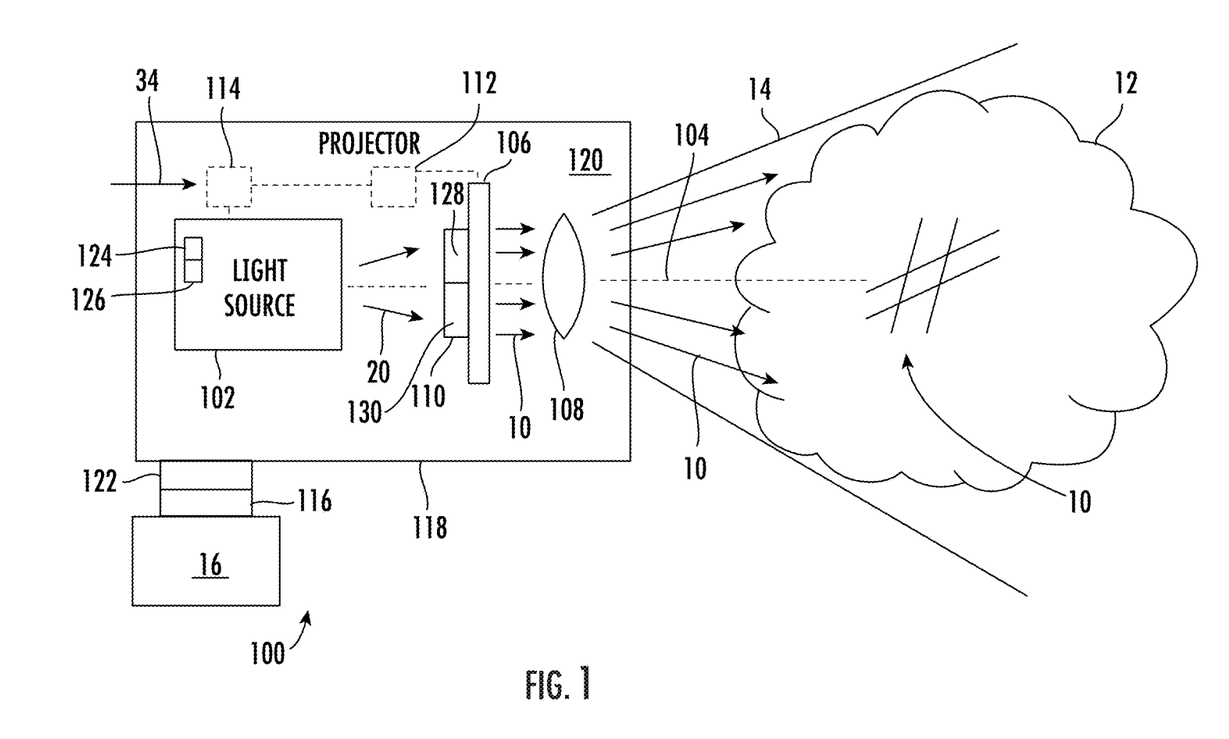
FIG. 1 is a schematic view of a projector constructed in accordance with the present disclosure, showing a light source optically coupled to a projection lens by a reticle with a pattern.

Reference will now be made to the drawings wherein like reference numerals identify similar structural features or aspects of the subject disclosure. For purposes of explanation and illustration, and not limitation, a partial view of an example of a projector in accordance with the disclosure is shown in FIG. 1 and is designated generally by reference character 100. Other embodiments of projectors, projector systems, and navigation methods are provided in FIGS. 2-8, as will be described. The systems and methods described herein can be used for navigating in environments having limited or degraded illumination, such as while trekking across lunar terrain, though the present disclosure is not limited to lunar trekking or to lunar environments in general.

With reference to FIG. 1, the projector 100 is shown. The projector 100 generally includes a light source 102 arranged along an optical axis 104, a reticle 106 optically coupled to the light source 102 along the optical axis 104, and a projection lens 108. The projection lens 108 is optically coupled to the reticle 106 along the optical axis 104 and defines thereon a navigation feature 110 arranged for generating a navigation feature image 10 for display on the terrain 12 disposed within a field of view 14 of the projector 100. As illustrated in FIG. 1 the projector 100 also includes a shifting element 112, a user interface 114, a stabilization module 116, and a housing 118.

The housing 118 has an interior 120 and a mounting feature 122. The light source 102, the reticle 106 and the projection lens 108 are arranged within the interior 120 of the housing 118 and are supported along the optical axis 104. The mounting feature 122 is arranged on an exterior of the housing 118 and is arranged for fixation of the projector 100 to a vehicle 16. In certain non-limiting examples, the vehicle 16 is an aircraft. In accordance with certain non-limiting examples, the vehicle 16 is a terrestrial or marine vehicle. It is also contemplated that projector 100 can be fixed to a space suit or other wearable assembly 18 (shown in FIG. 2).

The light source 102 is configured to illuminate the reticle 106 with light source illumination 20. In this respect the light source 102 is optically coupled to the reticle 106 along the optical axis 104 to convey the light source illumination 20 along the optical axis 104 to the reticle 106. In certain examples the light source 102 includes a visible light source 124 arranged to communicate visible light along the optical axis 104. In accordance with certain examples the light source 102 includes a laser light source 126 arranged to communicate laser light along the optical axis 104.

The reticle 106 optically couples the projection lens 108 to the light source 102 and defines thereon the navigation feature 110. In certain examples the reticle 106 includes a plate body formed from a transmissive material, e.g., glass, and is arranged to communicate a portion of light source illumination 20 incident upon the reticle 106 according to the projection lens 108 according to shape of the navigation feature 110. In certain examples the navigation feature 110 includes a transmissive portion 128 and an opaque portion 130 arranged to generate the navigation feature image 10 from a portion of the light source illumination 20 transmitted by the transmissive portion 128 of the navigation feature 110. The reticle 106 communicates the navigation feature image 10 to the projection lens 108 along the optical axis 104.

The projection lens 108 is optically coupled to the light source 102 by the optical axis 104 through the reticle 106 and is arranged to project the navigation feature image 10 from the projector 100 along the optical axis 104. In this respect the projection lens 108 projects the navigation feature image 10 within the field of view 14 of the projector 100 for display of the navigation feature image 10 on the terrain 12.

In certain examples the projection lens 108 includes an expansion lens arranged to project the navigation feature image 10 within the field of view 14 of size greater than that of the navigation feature 110. In accordance with certain examples the projection lens 108 has an aperture size that cooperates with the navigation feature 110 to provide depth of field sufficient to resolve the navigation feature image 10 in the direction of the horizon bounding the field of view 14, e.g., twenty (20) feet, when the projector 100 is fixed to the user's shoulder. It is contemplated the projection lens 108 be a slow lens with a large depth of focus, the projection lens 108 thereby able to maintain good image quality over long distances and over uneven surfaces such as may be found on lunar terrain. It is also contemplated that a laser scanning system can be employed to draw the image within the field of view 14 as an alternative to the projection lens 108.

Figure 2:
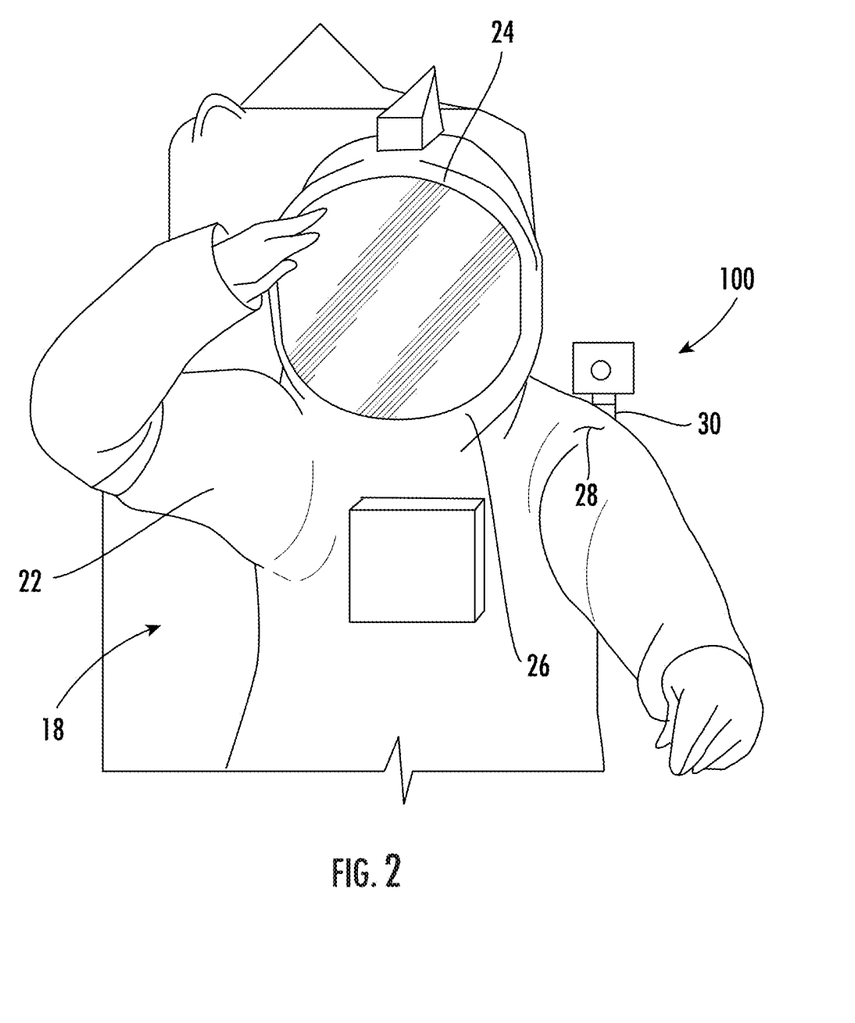
FIG. 2 is a perspective view of the projector of FIG. 1 according to an example, showing the projector fixed to the shoulder portion of an upper torso of a space suit or other wearable assembly.

With reference to FIG. 2, the projector 100 is shown fixed to the space suit or other wearable assembly 18. In the illustrated example the space suit or other wearable assembly 18 includes the projector 100, an upper torso hard shell 22 and a helmet 24. The upper torso hard shell 22 has a helmet seat 26, a shoulder portion 28, and a projector mount 30. The helmet 24 provides a helmet field of view contained with the field of view 14 (shown in FIG. 1) of the projector 100, is seated on the helmet seat 26, and is fixed relative to the upper torso hard shell 22. The projector 100 is seated on the projector mount 30, e.g., with the mounting feature 122 (shown in FIG. 1). In certain examples the projector 100 is fixed relative to the upper torso hard shell 22 by the projector mount 30. In accordance with certain examples the stabilization module 116 (shown in FIG. 1) is arranged between the mounting feature 122 and the projector mount 30 located on the upper torso hard shell 22 of the space suit or other wearable assembly 18.

Figure 3:
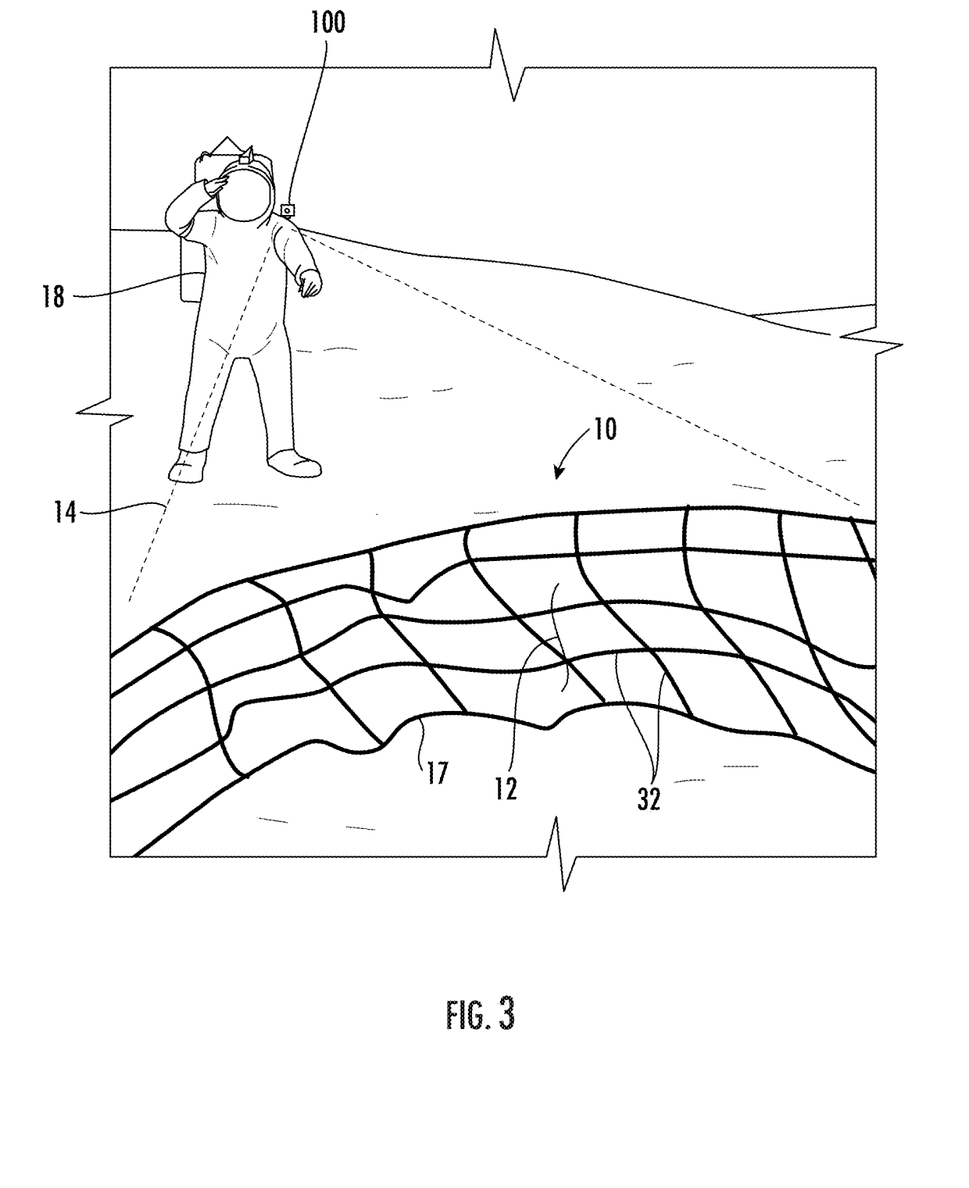
FIG. 3 is a perspective view of the projector of FIG. 1 according to an example, showing a pattern image projected by the projector displayed on terrain and making visible features and contour of the terrain.

With reference to FIG. 3, the projector 100 is shown projecting the navigation feature image 10 and displaying the navigation feature image 10 on the terrain 12 according to an example. During operation the light source 102 (shown in FIG. 1) illuminates the reticle 106 (shown in FIG. 1) with the light source illumination 20 (shown in FIG. 1). The reticle 106 in turn modulates illumination incident upon the reticle 106 according to the navigation feature 110 (shown in FIG. 1) and communicates a portion of the light source illumination 20 to the projection lens 108 (shown in FIG. 1) as the navigation feature image 10. The projection lens 108 projects the navigation feature image 10 into the field of view 14 of the projector 100. The terrain 12 disposed within the field of view 14 displays the navigation feature image 10 thereon conformally, the navigation feature image 10 thereby showing contour and shape of the terrain 12 irrespective of whether ambient solar illumination illuminates the terrain 12. In certain examples the projection lens 108 expands the navigation feature image 10 to at least partially fill (or entirely fill) the field of view 14 of the projector 100 for display on the terrain disposed within the field of view 14 of the projector 100.

It is contemplated that the navigation feature image 10 be formed in a way that allows a user, e.g., a user occupying the space suit or other wearable assembly 18, to appreciate features and/or contour 17 on the terrain 12 disposed within the field of view 14 of the projector 100. In certain examples the navigation feature image 10 defines a grid pattern 32 having intersecting grid lines on the terrain 12 such that distortion, e.g., departure from a repetitive pattern, in the grid pattern 32 corresponds to depth and rises in the terrain 12 otherwise difficult (or impossible) to discern using ambient solar illumination. In certain examples the grid pattern 32 is a fixed grid pattern, e.g., fixed according to the transmissive portion 128 (shown in FIG. 1) and the opaque portion 130 (shown in FIG. 1) of the reticle 106 (shown in FIG. 1).

With continuing reference to FIG. 1, when included in the projector 100, the user interface 114 is operably connected to the light source 102 to control the wavelength (or waveband) of the light source illumination 20. In certain examples the user interface 114 is arranged to change color of the light source illumination 20, and thereby the color of the navigation feature image 10 displayed on the terrain 12 according to a user input 34 received at the user interface 114. As will be appreciated by those of skill in the art in view of the present disclosure, changing the color forming the navigation feature image 10 displayed on the terrain 12 allows a user to select the color of the navigation feature image 10 as appropriate for the specific user negotiating the terrain 12 and/or the properties of ambient solar illumination in the particular lunar environment.

When included, the shifting element 112 is arranged to route the optical axis 104 around the navigation feature 110 and/or the reticle 106. For example, fold mirrors can be employed to route the light source illumination 20 about the navigation feature 110 and/or the reticle 106. Alternatively, the reticle 106 can be displaced from the optical axis 104. As will be appreciated by those of skill in the art in view of the present disclosure, bypassing the navigation feature 110 and/or the reticle 106 allows the projector 100 to illuminate the terrain 12 disposed within the field of view 14 of the projector 100 with unmodulated illumination, the projector 100 thereby operating as a flashlight. This eliminates the need to provision the space suit or other wearable assembly 18 with a general-purpose flashlight in additional to providing the above-described navigational assistance when traversing the terrain 12.

When included, the stabilization module 116 allows the projector 100 to move relative to the vehicle 16 or the space suit or other wearable assembly 18 (shown in FIG. 2). For example, when the stabilization module 116 is disengaged, the projector 100 is fixed relative to the vehicle 16 or the space suit or other wearable assembly 18 (shown in FIG. 2). When the stabilization module 116 is engaged the projector 100 is fixed relative to the terrain 12 such that the vehicle 16 or the space suit or other wearable assembly 18 is movable relative to the projector 100. This allows the projector 100 to locked to a feature of interest in the terrain 12, e.g., an article undergoing repair disposed within the terrain, while the vehicle 16 or the space suit or other wearable assembly 18 moves relative to the terrain 12. It is contemplated that the projector 100 be engaged and disengaged using a user input, e.g., the user input 34, received at the user interface 114.

Figure 4:
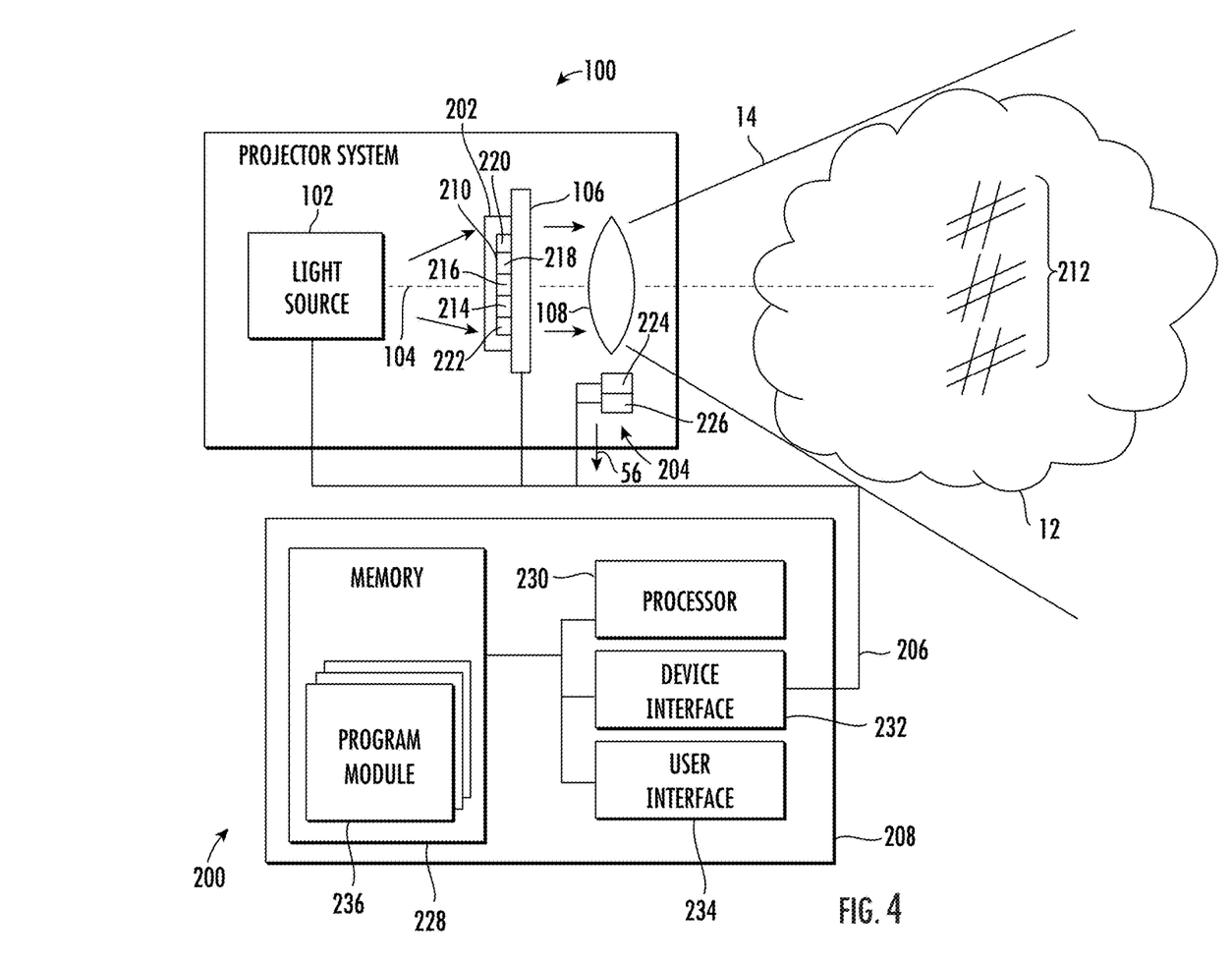
FIG. 4 is a schematic view of the projector of FIG. 1 according to another example, showing a projector with a sensor for acquiring data from terrain within the field of view of the projector such that the projector projects an overlay on the terrain using the acquired data.
Figure 5:
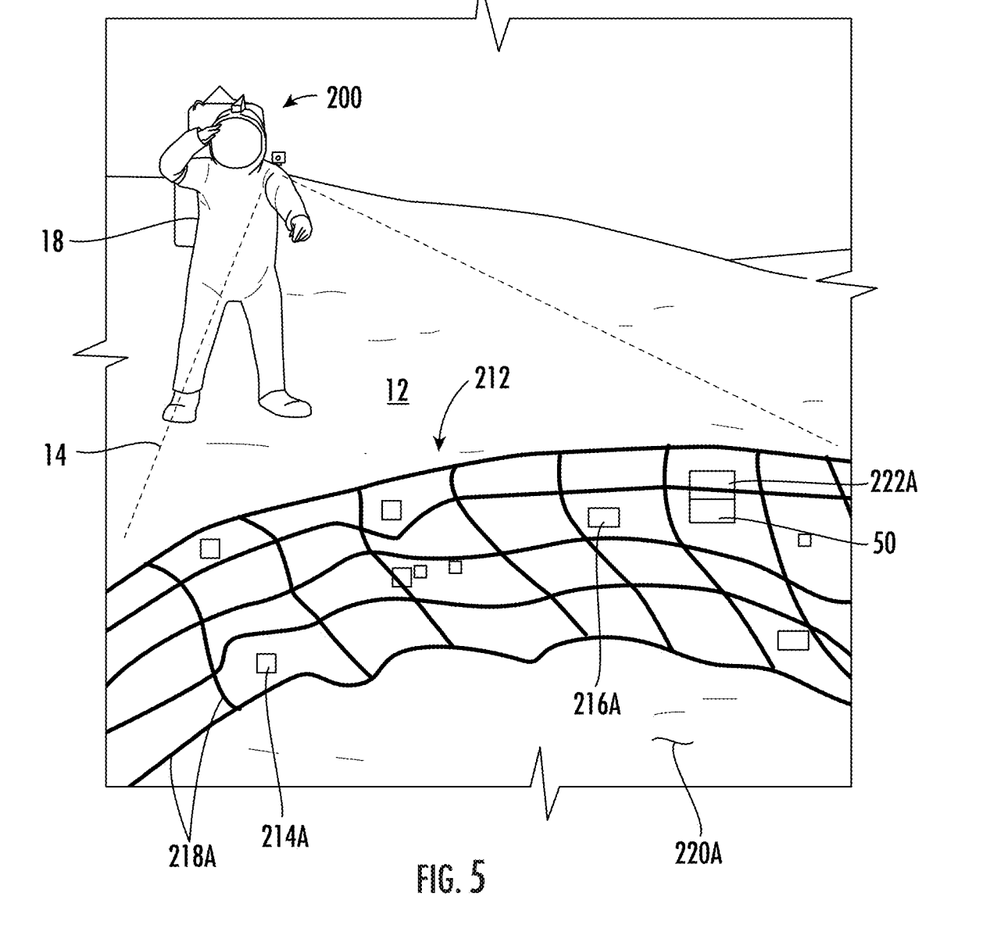
FIG. 5 is a perspective view of the projector of FIG. 1, showing the projector projecting an overlay on lunar terrain including tags derived from data acquired from the terrain by a sensor.

With reference to FIGS. 4 and 5, a projector system 200 is shown. The projector system 200 includes the projector 100, a micro display 202, and a sensor 204. The projector system 200 also includes a link 206 and a controller 208.

The projector 100 is as described above and additionally includes the micro display 202. The micro display 204 is operably associated with the controller 208 and is arranged to form a navigation feature 210 according to a signal received from the controller 208 via the link 206. In this respect it is contemplated that the micro display 204 be arranged to define within the navigation feature 210 one or more predetermined indicators in association with features on the terrain 12 disposed within the field of view 14 of the projector system 200. For example, the navigation feature 210 can be defined by the micro display 204 with one or more of a mineral tag 214 and/or a water or ice tag 216 within a grid 218 is spatial association with minerals and/or water or ice on the terrain 12 disposed within the field of view 14 when the grid is displayed on the terrain 12. As shown in FIG. 5, the navigation feature 210 formed by the micro display 204 forms a navigation feature image 212 including a mineral tag image 214A and/or a water or ice tag image 216A within a grid image 218A displayed in spatial association on the terrain 12 with the associated mineral and water or ice on the terrain.

In certain examples the navigation feature 210 can be defined by the micro display 204 to impart into the navigation feature image 212 imagery 220 of the terrain 12 disposed within the field of view 14 for conformal display on the terrain 12. As shown in FIG. 5, the imagery 220 is in projected by the projector system 200 on and displayed on terrain 12 in registration with the imaged terrain 12 as an image 220A. As will be appreciated by those of skill in the art in view of the present disclosure, conformal display of imagery of the terrain 12 on the terrain 12 allows the user to appreciate features of the terrain 12 that are otherwise not illuminated by the ambient solar illumination.

In accordance with certain examples the micro display 204 is arranged to form a schematic or procedure 222 for display on the terrain 12. The schematic or procedure 222 can correspond to an article 50 (shown in FIG. 5) located on the terrain 12, such as a machine requiring service or repair, the schematic or procedure 222. As shown in FIG. 5, it is contemplated that the projection system 200 project a schematic or procedure image 222A and display the schematic or procedure image 222A on the article 50 within the terrain 12. As will be appreciated by those of skill in the art in view of the present disclosure, displaying the schematic or procedure image 222A of the article 50 requiring service or repair on the article facilitates service or repair of the article 50.

The sensor 214 is arranged for acquiring sensor data 36 containing information relating to the terrain 12 disposed within the field of view 14. In this respect the sensor 214 is in communication with the terrain 12 and is operably associated with the controller 208 to acquire the sensor data 36. The controller 208 is in turn arranged to generate the imagery 220 of the terrain 12 disposed within the field of view 14 for conformal display on the terrain 12. The imagery 220 can include navigational information, such as directional indicator. The imagery 220 can include an image overlay of the actual terrain as perceived by the sensor 214 that the projector system 200 projects onto the terrain. For example, an image of objects within a pitch-black depression as well as the contour of the depression can be projected into the depression and one the objects and contour of the depression to show the depth, presence of objects (e.g., rocks, etc.), within the depression.

In certain examples the sensor 214 includes a time-of-flight sensor 224. In accordance with certain examples the sensor 214 can include a structured light sensor 226, such as a lidar sensor. Although shown and described herein as integrated within the projector 100, e.g., arranged within the housing 118, it is to be understood and appreciated that the sensor 214 can be separate from the projector 100, such as a sensor 214 carried by the user or remote sensor 214. As will also be appreciated by those of skill in the art in view of the present disclosure in view of the present disclosure, the projector system 200 can include other types of sensors suitable for ascribing depth information to the terrain 12 disposed within the field of view 14 the projector system 200 and remain with the scope of the present disclosure.

The controller 208 includes the memory 228, a processor 230, a device interface 232, and a user interface 234. The device interface 232 is connected to the sensor 214 and the micro display 204 by the link 216. The processor 230 is disposed in communication with the device interface 232 and is operably connected therethrough to the sensor 214 and the micro display 204 and is disposed in communication with the user interface 234 and the memory 228. The memory 228 has a plurality of program modules 236 recorded thereon containing instructions that, when read by the processor 230, cause the processor 230 execute certain operations. Among those operations are operations for a navigation method 300 (shown in FIG. 6), as will be described.

Figure 6:
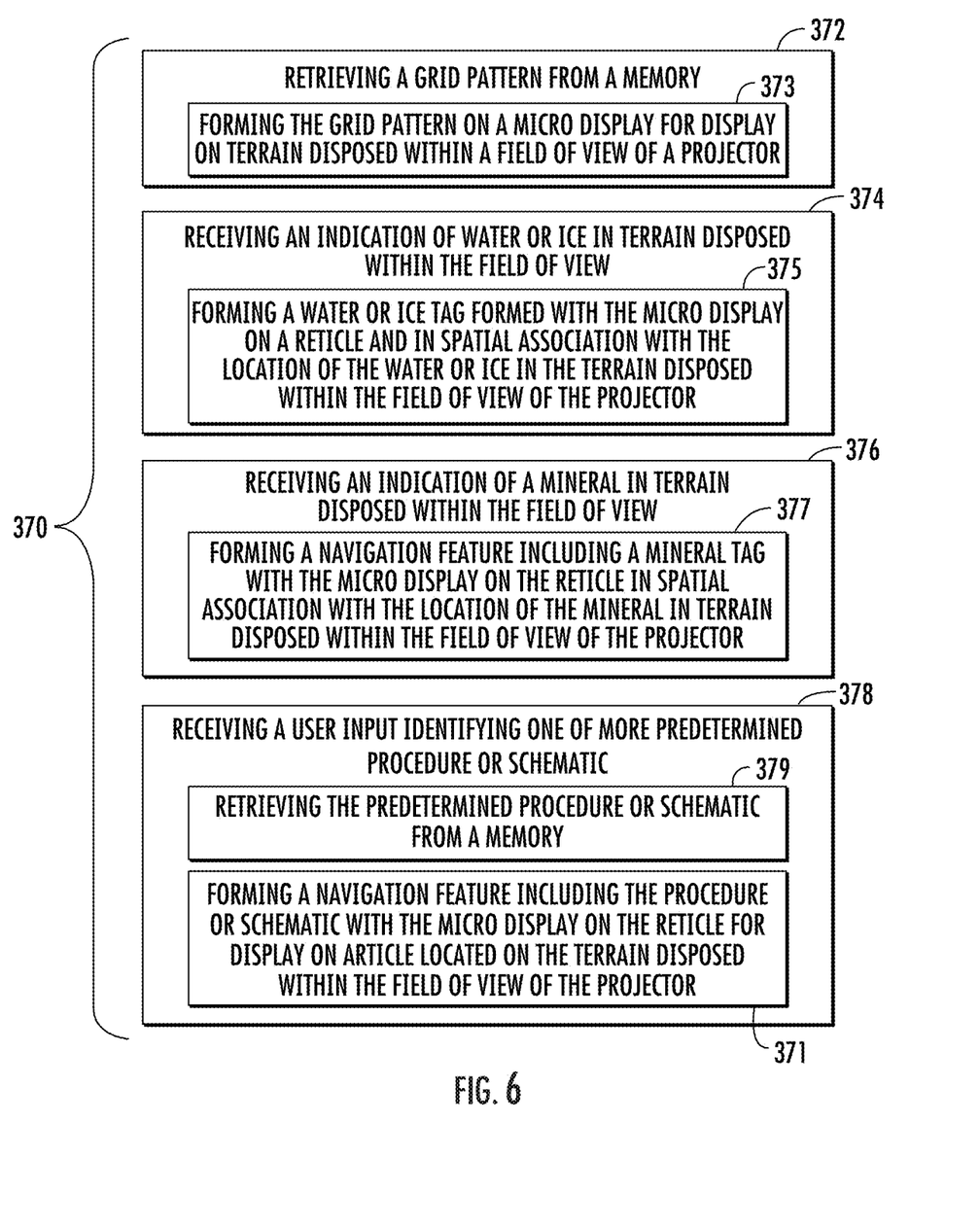
FIGS. 6-8 are block diagrams of a navigation method in accordance with the present disclosure, showing operations of the method according to illustrative and non-limiting examples of the method.

With reference to FIG. 6, the navigation method 300 is shown. The method 300 includes illuminating a reticle having a navigation feature, e.g., the reticle 106 (shown in FIG. 1) having the navigation feature 110 (shown in FIG. 1), as shown with box 310. A navigation feature image is generated using the navigation feature, as shown with box 320. The navigation feature image is communicated to a projection lens, e.g., the projection lens 108 as shown with box 330. The projection lens projects the navigation feature image into a field of view of the projector, as shown with box 340. The navigation feature image is displayed on terrain within the field of view of the projector, e.g., the terrain 12 (shown in FIG. 1), as shown with box 350. Features and/or contour of the terrain are negotiated using the displayed image, e.g., by a vehicle operator (shown with box 362) or lunar trekker (shown with box 362), negotiating the terrain, as shown with box 360. As shown with bracket 370, generating the navigation feature image can include forming a predetermined navigation feature on the reticle using a micro display, e.g., the micro display 212 (shown in FIG. 1). As shown with bracket 380, generating the navigation feature can include forming the navigation feature from image data using the micro display of the reticle.

Figure 7:
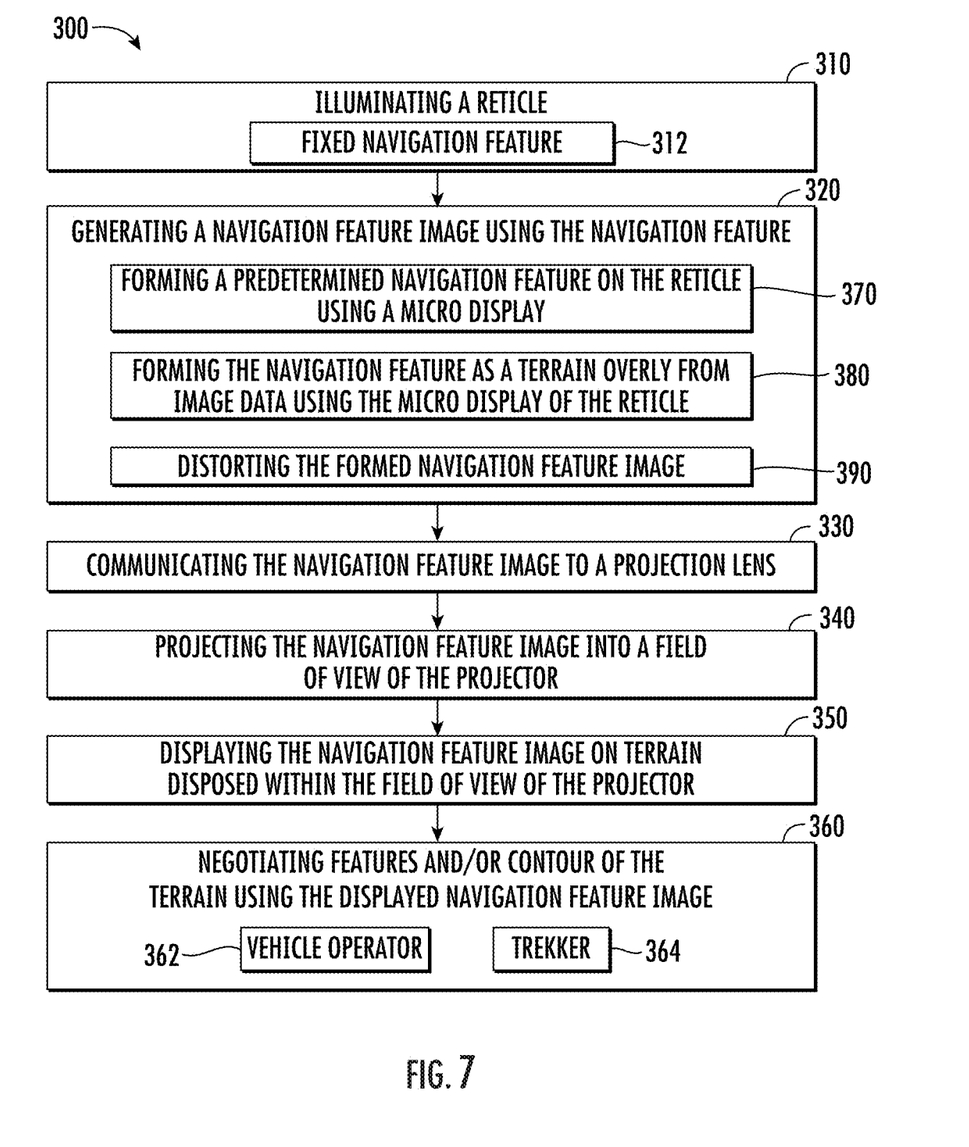

With reference to FIG. 7, operations for forming the predetermined navigation feature on the reticle using the micro display are shown with a bracket 370 according to an example. As shown with box 372, a grid pattern can be retrieved from a memory and formed on the micro display for display on terrain disposed within the field of view, as shown with box 373. As shown with box 374, indication of water or ice in terrain disposed within the field of view can be received and a water or ice tag formed with the micro display on the reticle in spatial association with the location of the water or ice in the terrain disposed within the field of view, as shown with box 375. As shown with box 376, indication of a mineral in terrain disposed within the field of view can be received and a mineral tag formed with the micro display on the reticle in spatial association with the location of the mineral in terrain disposed within the field of view, as shown with box 377. It is also contemplated that a user input identifying one of more predetermined procedure or schematic can be received, the predetermined procedure or schematic can be retrieved from a memory, and the procedure or schematic formed by the micro display for display on article located on the terrain disposed within the field of view, as shown with boxes 378, 379, and 371.

Figure 8:
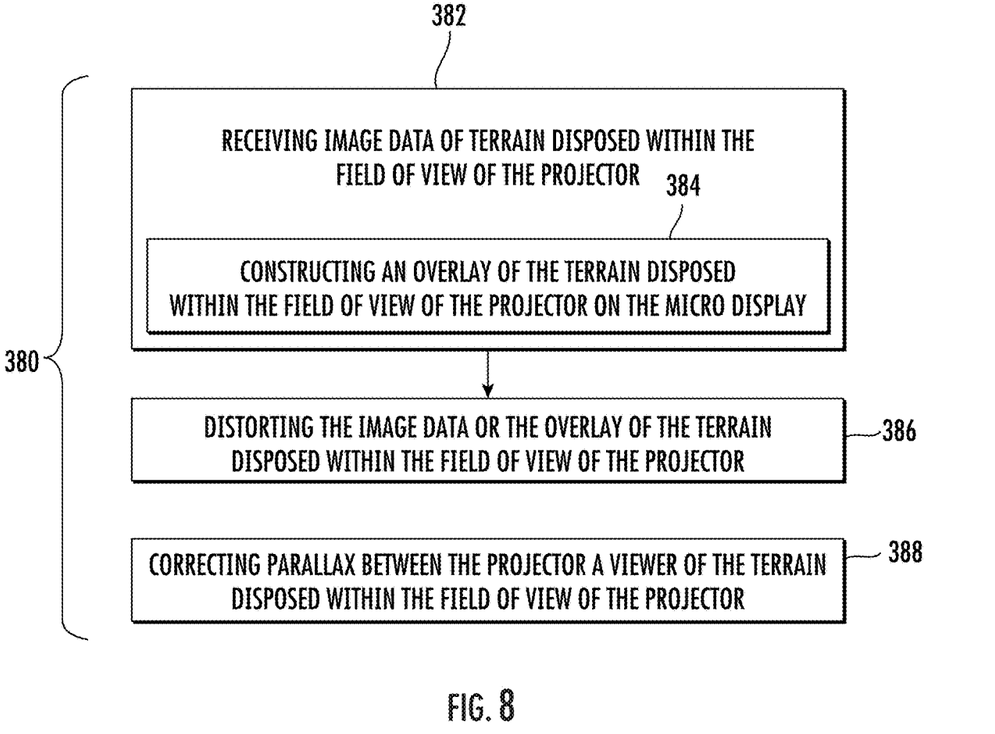

With reference to FIG. 8, operations for forming the navigation feature from image data using the micro display of the reticle are shown with a bracket 380 according to an example. As shown with box 382, image data of terrain disposed within the field of view, e.g., the image data 36 (shown in FIG. 4), is received. An overlay of the terrain disposed within the field of view is formed on the reticle with the micro display, as shown with box 384. As shown with box 386, the image data or the image reconstruction of the micro display can be distorted for displaying the overly conformally on the terrain disposed within the field of view to correct parallax, e.g., between the location of the projector system and a helmet of a space suit or other wearable assembly to which the projector system is fixed, as shown with box 388.

Navigation systems commonly require external data, such as from GPS and/or Wi-Fi systems. The external data generally allows the navigation system to provide an individual with information sufficient to overcome unfamiliarity with the terrain and/or poor situational awareness, the individual thereby being able to safely negotiate the terrain. Navigation in environments where such external data is unavailable can be more difficult as the individual negotiating the terrain must typically rely on direct observation of the terrain being negotiated to safely traverse the terrain. This can be difficult under certain types of illumination, such as during lunar trekking where the atmosphere in unable to scatter solar illumination to adequately illuminated terrain not directly illuminated. As a consequence, lunar trekking can entail risk of injury and/or equipment damage due to failure to appreciate trip hazards encountered during trekking, such as features in dark shadows and/or bright-lit rises in the lunar terrain.

In examples described herein projectors are employed to project and display an image in the user field of view. The displayed image allows the user to appreciate features presenting trip hazards within the user field of view that are to appreciate, providing situational awareness to the user and thereby limiting the risk of injury and/or equipment damage while negotiating the terrain. In certain examples projectors described herein include a high-bright projector arranged to display images ahead of the user that provide information about the terrain being negotiated by the user. In accordance with certain examples the projector projects a grid pattern for display in field of view, the grid pattern overlaying features in the terrain. In accordance with certain examples the projector can employ a laser source (or other display illumination device with a slow lens), the displayed grid thereby in-focus within a depth of focus extending the horizon of the user's field of view.

It is contemplated that, in certain examples, a projector system includes the projector and a spectral sensor. In such examples the spectral sensor acquires spectral data from the terrain being negotiation by the user. The spectral data contains spectral information regarding composition of the terrain being negotiated by the user, e.g., presence of water or ice and/or minerals of interest. In certain examples the projector system identifies locations of water or ice and/or minerals of interest in terrain, inserts a flag in image projected by the projector, and displays the flag on the terrain in association with location of the water or ice and/or mineral of interest in the terrain being negotiated by the user. As will be appreciated by those of skill in the art, this allows user to exploit water or ice and/or minerals encountered as the user traverses the terrain as well as to avoid hazards presented by features in the terrain.

It is also contemplated that, in accordance with certain examples, a projector system includes the projector and an imaging system. In such examples the imaging device acquires image data including depth data of the terrain being negotiated by the user, the image data be reconstructed by create an overlay of the terrain being negotiated by the user, and that the overlay be projected and conformal displayed on the terrain being negotiated by the user. As will be appreciated by those of skill in the art in view of the present disclosure, conformally displaying an image of the terrain on the terrain ahead of the user allows the user to appreciate rocks, holes, craters and/or other obstacles in terrain traversed by the user. In certain examples the imaging device can include a time-of-flight sensor, a structured light sensor, or a lidar sensor. Reconstructing the image can include modifying, e.g., distorting the image for parallax correction, the projected the image to compensate for difference between the sensor location and/or the projector location relative to the location of the user and/or the field of view of the user.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:
1. A projector, comprising:
a light source arranged along an optical axis;
a reticle optically coupled to the light source along the optical axis;

a projection lens optically coupled to the reticle along the optical axis,
wherein the reticle has a navigation feature defined thereon for displaying an image of the navigation feature projected along the optical axis on terrain disposed within a field of view of the projector; and
a micro display arranged on the reticle and configured to form one or more of a grid pattern, a water or ice tag, a mineral tag and an overlay of the terrain disposed within the field of view of the projector.

2. The projector of claim 1, wherein the light source includes a laser arranged to illuminate the navigation feature with laser light.

3. The projector of claim 1, wherein the light source includes a visible source arranged to illuminate the navigation feature with visible light.

4. The projector of claim 1, wherein the navigation feature is fixed to the reticle and defines a grid pattern.

5. The projector of claim 1, A projector, comprising:
a light source arranged along an optical axis;
a reticle optically coupled to the light source along the optical axis; and
a projection lens optically coupled to the reticle along the optical axis,
wherein the reticle has a navigation feature defined thereon for displaying an image of the navigation feature projected along the optical axis on terrain disposed within a field of view of the projector;
wherein the navigation feature includes a water or ice tag or a mineral tag.

6. The projector of claim 1, wherein the navigation feature includes an overlay of the terrain disposed within the field of view of the projector.

7. The projector of claim 1, further comprising a sensor in communication with the terrain disposed within the field of view of the projector.

8. The projector of claim 7, wherein the sensor includes a time-of-flight sensor or a structured light sensor optically coupled to the terrain disposed within the field of view of the projector.

9. The projector of claim 1, wherein the projection lens includes a slow lens or a laser scanning system.

10. The projector of claim 1, further comprising:
an upper torso hard shell having a helmet seat and a shoulder portion; and
a helmet fixed to the helmet seat of the upper torso hard shell, wherein the projector is coupled to the shoulder portion of the upper torso hard shell.

11. The projector of claim 10, wherein the projector is fixed relative to the helmet.

12. The projector of claim 10, further comprising a stabilization module coupled to the projector and arranged to allow the upper torso hard shell to move relative to the projector while the projector is fixed relative to the terrain disposed within the field of view of the projector.

13. The projector of claim 1, further comprising a shifting element arranged to bypass the navigation feature with light communicated by the light source.

14. A projector system, comprising:
a projector comprising:
a light source arranged along an optical axis;
a reticle optically coupled to the light source along the optical axis; and
a projection lens optically coupled to the reticle along the optical axis,
wherein the reticle has a navigation feature defined thereon for displaying an image of the navigation feature projected along the optical axis on terrain disposed within a field of view of the projector, wherein the reticle includes a micro display arranged on the reticle and arranged along the optical axis; and
a controller operably connected to the micro display and responsive to instructions recorded on a non-transitory machine-readable memory to:
illuminate the navigation feature with light source illumination to generate a navigation feature image;
project the navigation feature image into the field of view of the projector with the projection lens; and
display the navigation feature image on the terrain disposed within the field of the projection lens.

15. The projector system of claim 14, wherein the instructions cause the controller to:
select a color for the at least one of a grid pattern, a water or ice tag, a mineral tag, and an overlay of terrain disposed along the optical axis with the micro display;
illuminate the micro display with light having the selected color; and
display the at least one of a grid pattern, a water or ice tag, a mineral tag, and an overlay of the terrain disposed along the optical axis on the terrain disposed along the optical axis with the selected color.

16. The projector system of claim 14, further comprising a time-of-flight sensor or a structured light sensor disposed in communication with the controller and having a field of view intersecting the optical axis of the projector, wherein the instructions cause the controller to:
acquire image data of the terrain disposed along the optical axis; and
reconstruct an image of the terrain with the micro display; and
project the image of the terrain by illuminating the micro display with the light source for display on the terrain from the which the image data was acquired.

17. The projector system of claim 16, wherein reconstructing the image includes distorting the image for conformal display on the terrain disposed along the optical axis.

18. The projector system of claim 14, wherein the instructions further cause the controller to:
generate a one or more of a predetermined map, a predetermined schematic, and a predetermined procedure with the micro display; and
project an image of the one or more of a predetermined map, a predetermined schematic, and a predetermined procedure along the optical axis with the light source.

* * * * *